March 12, 1929.   A. J. JANSSON   1,704,834
CUSHION CONNECTION FOR VEHICLE CONSTRUCTION
Filed Feb. 25, 1926
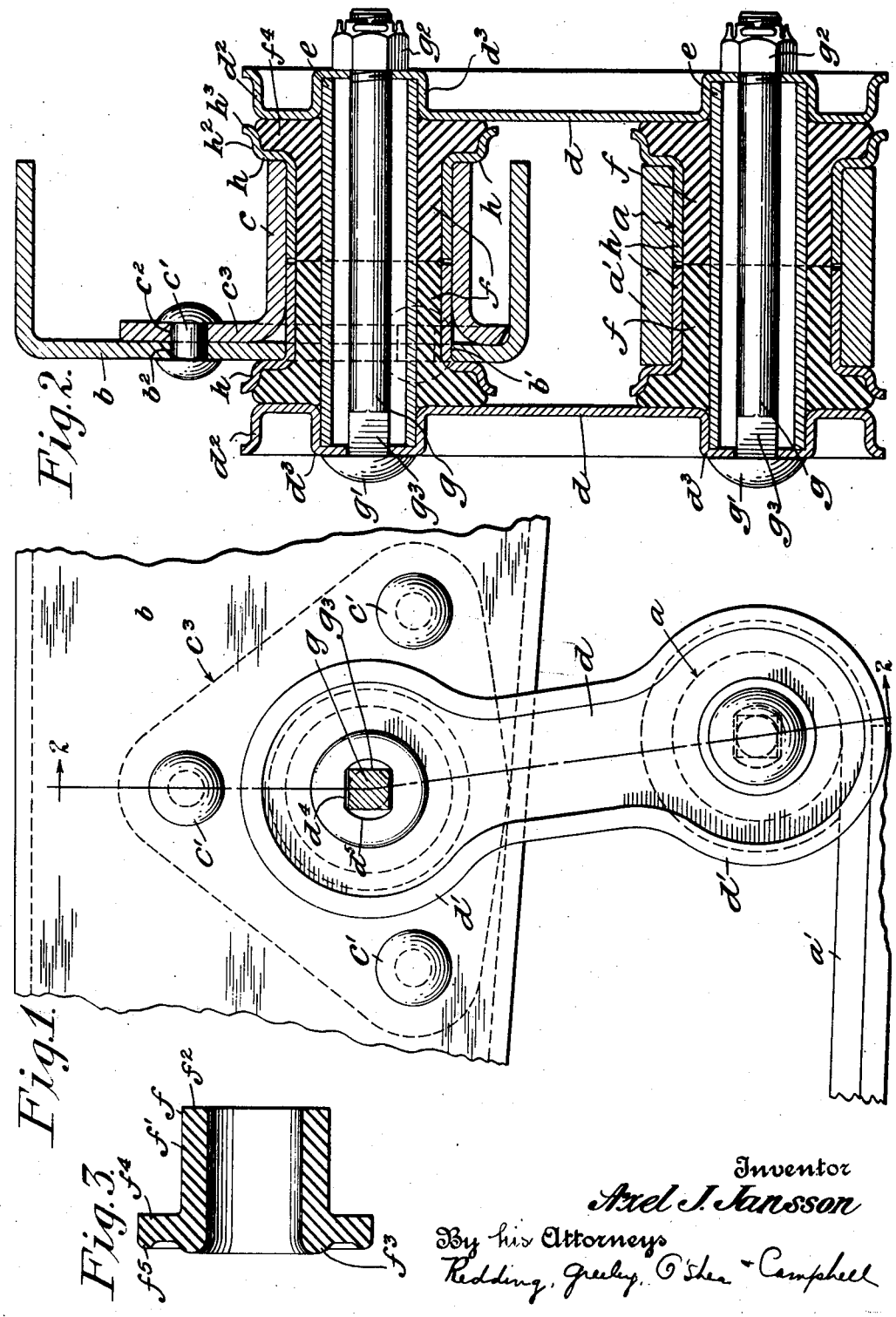
Inventor
Axel J. Jansson
By his Attorneys
Redding, Greeley, O'Shea & Campbell Patented Mar. 12, 1929.

1,704,834

UNITED STATES PATENT OFFICE.

AXEL J. JANSSON, OF HILLSIDE, NEW JERSEY, ASSIGNOR, BY MESNE ASSIGNMENTS, TO INTERNATIONAL MOTOR COMPANY, OF NEW YORK, N. Y., A CORPORATION OF DELAWARE.

CUSHION CONNECTION FOR VEHICLE CONSTRUCTION.

Application filed February 25, 1926. Serial No. 90,493.

In the usual motor vehicle construction the vehicle leaf spring is connected to and supports the chassis frame with provision for spring elongation and this spring elongation is afforded by a link or shackle connection between one end of the spring and the frame. Ordinarily, the shackle includes a pin passing through an eye formed on the end of the spring and seated in or connected with a link or links pivotally mounted on the frame. Such a shackle connection, because of the metal to metal contact, is subject to great wear, requires constant lubrication to reduce the wear and minimize squeaks and rattling and transmits with undiminished intensity shocks and stresses impressed upon the road wheels. It has heretofore been proposed to avoid the objectionable features of wear and the necessity for lubrication and to cushion to some extent the shocks and stresses by the interposition between the pins of the shackle and the eyes on the spring and frame of rubber bushings. It is desirable, however, in the interest of increased wear, resiliency and strength to retain the bushings under internal static pressure and this has not been accomplished to an appreciable degree by the previous proposals. The present invention has for its object a structure wherein yielding non-metallic material interposed between the pins of the shackle and the eyes on the co-acting elements is maintained under the requisite degree of compression for the purpose in hand. The invention also seeks to cushion the links with respect to the eyes and these objects are accomplished by the provision of collars of yielding non-metallic material on the bushings which surround the pins within the eyes whereby upon assembly the collars are placed under a degree of compression which is transmitted throughout the entire bushing. The invention also has to do with the structure by which the foregoing objects are attained having in mind practical manufacturing conditions. These and other objects of the invention and the means for their attainment will be more apparent from the following detailed description of the accompanying drawings illustrating a preferred embodiment of the invention in which:

Figure 1 is a view showing the spring shackle according to the present invention in side elevation and including fragmentary representations of the vehicle leaf spring and a side member of the chassis frame.

Figure 2 is a view in transverse vertical section taken in the planes indicated by the broken line 2—2 in Figure 1 and looking in the direction of the arrows and showing the manner of cushioning the shackle pins by yielding non-metallic material retained under compression.

Figure 3 is a view showing, in section, one of the bushings of yielding non-metallic material prior to its insertion in the connection according to Figure 2.

The spring shackle link according to the present invention is preferably composed of pressed metal since such composition considerably simplifies manufacturing operations and reduces costs. It is intended to connect the eye $a$ of a vehicle leaf spring $a'$ with the chassis frame of a vehicle, the longitudinal side member of which is indicated at $b$. The co-operating parts of the shackle link are made identical to the end that manufacture, assembly and distribution may be simplified. Therefore, an eye similar in size to the spring eye $a$ is provided on frame member $b$ by the formation of an aperture $b'$ in the web of the channel and the provision of a flanged cylindrical supporting member $c$ secured to the web of the channel, say by rivets $c'$ through suitable apertures $b^2$ in the channel and apertures $c^2$ in the flange $c^3$ of the supporting element. The interior diameter of the cylindrical portion of the supporting element is the same as the interior diameter of the aperture $b'$ and the axial length of the passage as a whole formed by the cylindrical member and the aperture in the web is equal to the axial width of spring eye $a$. Extending between the two eyes are pressed metal links $d, d$ enlarged at their extremities as at $d'$ and given there a substantially circular form. The edges $d^2$ of the links are turned at right angles to the inner faces thereof in the interest of strength as shown clearly in Figure 2. Usually the shackle links are connected by pins passing through the spring eye and rotatable with respect to the frame member. According to the present invention cylindrical spacing elements e which may be formed, if desired, of ordinary cast iron pipe are utilized to connect and space the links and these tubes e are of a less diameter than the interior of the eyes to permit the introduction therebetween of bushings of yielding non-metallic material f, f. The cylindrical elements e, e are preferably seated at their extremities within bosses $d^3$ formed in the links and the entire structure comprising a pair of links d and spacing and connecting elements e is maintained as a rigid whole through the instrumentality of bolts g, g, whereof the heads g' engage the outer surfaces of the bosses of one link d and the nuts $g^2$ engage the outer surfaces of the bosses of the other link. The bolts are prevented from rotation by flats $d^4$ formed in apertures $d^5$ of one link co-acting with the squared shanks $g^3$ of the bolts. Both of the apertures in each link may be so formed in order that the links may be interchangeable or one of the apertures in each of a pair of links may be provided with flats in which event by a reversal of the position of one of the bolts the effect is obtained and this may be found practical in some situations.

As has been pointed out hereinbefore it is proposed to maintain the bushings of yielding non-metallic material under compression in order that their strength, resiliency and wearing qualities may be increased. Preferably the bushings are formed of rubber. To facilitate assembling and in order to obtain the requisite degree of compression the bushings are formed in two parts as indicated in Figure 3 whereof the cylindrical body portion $f'$ is provided with a squared end $f^2$ to abut against the proximate squared end of the adjacent bushings and a rounded enlarged end $f^3$ having formed adjacent thereto a flange $f^4$ likewise terminating in a rounded enlarged corner $f^5$ corresponding in position and shape to (although slightly smaller than) the protrusion $f^3$. In order to confine the yielding non-metallic material most advantageously annular seats h are disposed within the respective eyes a and c. These seats are formed with outwardly extending flanges $h'$ bent again as at $h^2$ and again outwardly as at $h^3$ to receive the flanges $f^4$ of the bushings. When the links are drawn together by the bolts $g'$ the seats so formed co-operate with the links to crowd the rubber inwardly taking advantage of the natural "flow" of the rubber to maintain the entire bushings under internal static pressure.

Upon assembly the spacers e and the seats f, f, are placed within the eyes. The yielding non-metallic material is then introduced between the spacers and the seats and because of the oversize structure the respective flanges portion of the bushings are distorted outwardly. The links are then applied to the spacers e and through the instrumentality of the bolts are drawn together to bear upon and compress the yielding non-metallic material.

By the construction described a shackle connection for the end of the spring is provided wherein the requirement of lubrication is avoided; the tendency to squeaks and rattles resulting from wear is obviated and the shocks and vibrations impressed upon the wheel are cushioned or absorbed and prevented from transmission to the vehicle body.

Various modifications may be made in the form, disposition and manner of fabricating the elements going to make up the device as a whole and no limitation is intended by the foregoing description except as indicated in the appended claims.

What I claim is:

1. In a cushion connection of the character described, the combination with a vehicle leaf spring formed with an eye and the chassis frame, of a link, pins connecting the link with the spring eye and frame, respectively, yielding non-metallic bushings formed with flanges at their extremities of reduced thickness intermediate their inner and outer peripheral edges interposed between the pins and the co-acting parts, and means to compress said flanges whereby the reduced portion permits greater axial flow of the material in the bushing.

2. In a cushion connection of the character described, the combination with a vehicle leaf spring formed with an eye and the chassis frame carrying an eye, of opposed pressed metal links, apertured recesses in the links, cylindrical spacers between the links seated in the recesses and disposed within the respective eyes, yielding non-metallic bushings with flanges at their extremities disposed between the spacers and the eyes, respectively, and bolts to secure the spacers and links together.

3. In a cushion connection of the character described, the combination with a vehicle leaf spring formed with an eye and the chassis frame carrying an eye, of opposed pressed metal links, apertured recesses in the links, cylindrical spacers between the links, seated in the recesses and disposed within the respective eyes, two-part pressed metal seat members carried by the frame and formed with end portions of increased diameter, yielding non-metallic bushings formed with flanges at their extremities disposed between the spacers and the seat members, respectively, and bolts to secure the spacers and links together.

4. In a cushion connection of the character described, the combination with a channel-shaped side frame member formed with an aperture and a leaf spring formed with an eye, of a cylindrical member carried with the channel in register with the aperture to form an eye, of two part pressed metal seat members disposed within the respective eyes and formed with portions of increased diameter at the ends of the eyes, cylindrical spacers, yielding non-metallic bushings interposed between the seats and the spacers and formed with flanges at their extremities disposed within the eyes, respectively, pressed metal links formed with circular recesses to receive the ends of the spacers, respectively, and bearing on the flanged ends of the bushings and bolts to secure the links to the spacers.

This specification signed this 19th day of February A. D. 1926.

AXEL J. JANSSON.